June 3, 1952   R. M. BALDWIN   2,599,151
RECIPROCATING ELEMENT OPERATING DEVICE
Filed June 1, 1948   2 SHEETS—SHEET 1
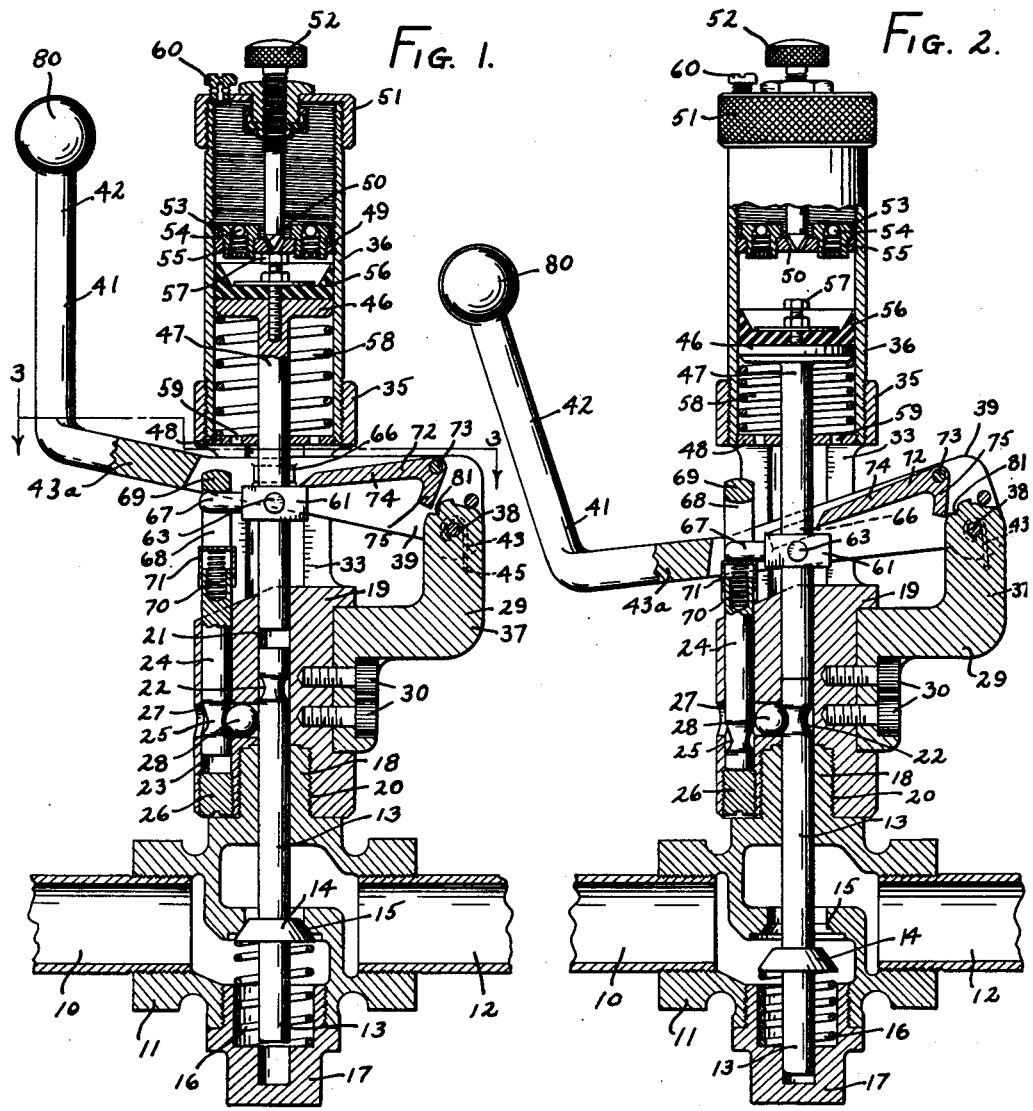
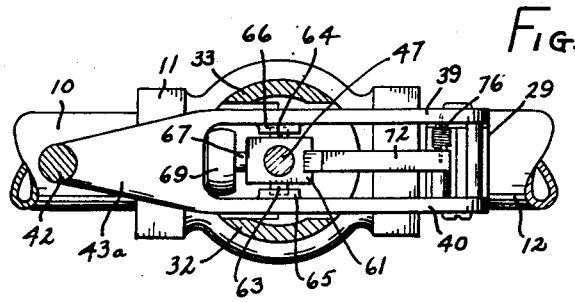
INVENTOR,
ROBERT M. BALDWIN,
By Herbert A. Winturn,
ATTORNEY.

June 3, 1952  R. M. BALDWIN  2,599,151
RECIPROCATING ELEMENT OPERATING DEVICE
Filed June 1, 1948  2 SHEETS—SHEET 2
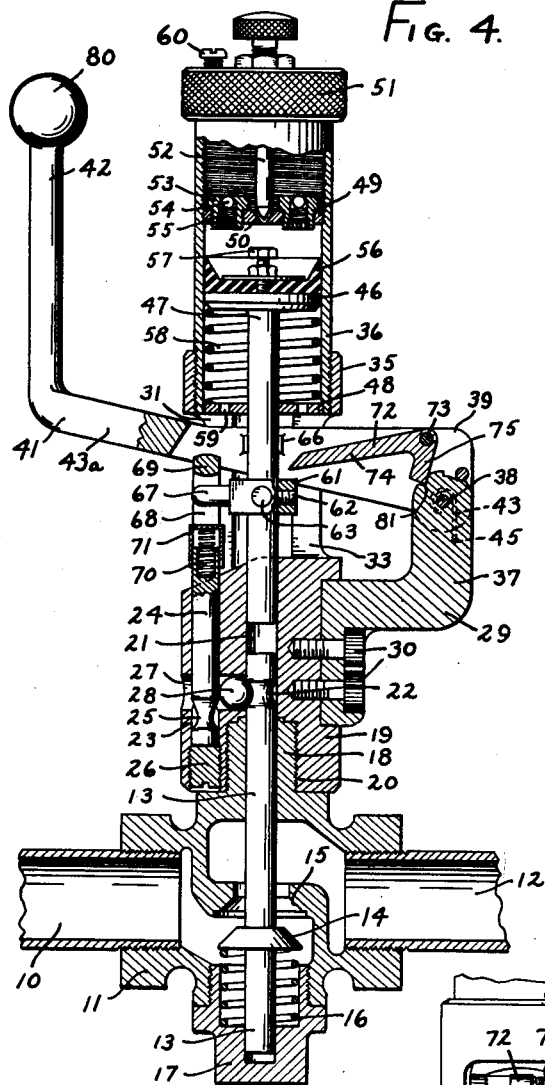
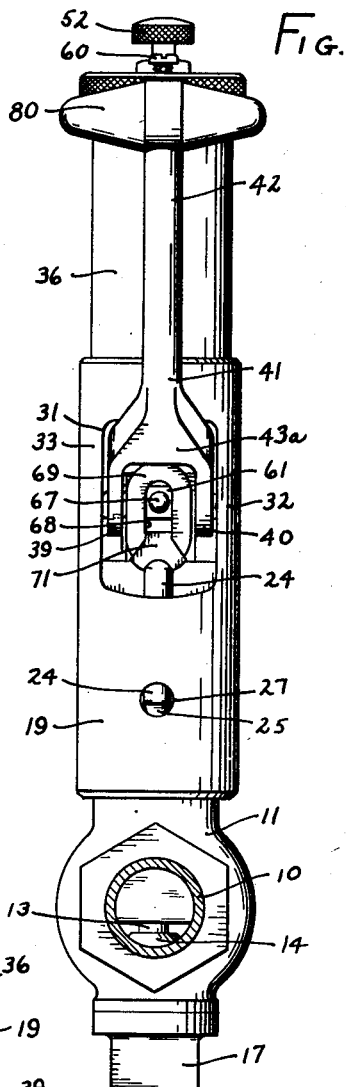
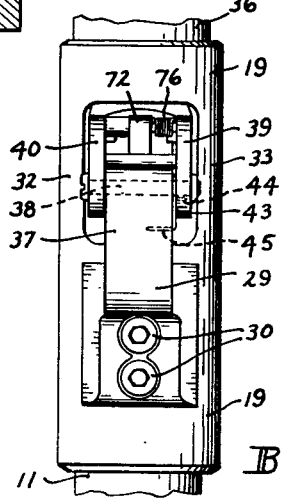
INVENTOR,
ROBERT M. BALDWIN,
BY Hubert A. Minturn
ATTORNEY.

Patented June 3, 1952

2,599,151

UNITED STATES PATENT OFFICE 2,599,151

RECIPROCATING ELEMENT OPERATING DEVICE

Robert M. Baldwin, New Castle, Ind.

Application June 1, 1948, Serial No. 30,398

6 Claims. (Cl. 161—1)

This invention relates to a valve which may be initially opened and then will automatically close following a predetermined length of time, whereby a predetermined flow of a fluid may be had.

The valve finds many uses, one particular use being on a coffee urn such as may be employed in restaurants and the like, where a predetermined amount of water is flowed into the coffee urn for a predetermined amount of coffee, so that the desired coffee mix may be had uniformly for each brew. The invention of course is not to be limited to that obligation. An advantage of the invention lies in the fact that once the operating lever of the valve is pulled to its open position, the further operation of the valve becomes automatic, and its operation does not depend upon an operator to remember to further operate the valve when the desired flow has been reached. In other words the valve works automatically once it has been opened. It may be adjusted for different lengths of flows, and of course the valve may be made in different sizes depending upon the capacity intended.

A further advantage of the invention lies in the fact that once the operating lever is shifted to the valve open position, it can not be returned to the closed position due to a "fool proof" construction which requires the valve to remain open until it has permitted the required volume of flow therethrough. In other words, after the valve operating lever has been shifted to the open position, and assuming that it has travelled part way back to the closed position, the handle can not be again operated in that intermediate position until the complete flow has been had, so that the predetermined flow is had at any and all times the handle or lever of the valve may be shifted to the open position.

These and many other objects and advantages of the invention such as the extreme simplicity of its construction, its durability of construction, and its certainty of operation at all times in the manner intended, will be apparent to those versed in the art in the following description of one particular form of the invention as illustrated in the accompanying drawings, in which:

Fig. 1 is a view in vertical, diametrical section through a structure embodying the invention with the valve in the closed positions;

Fig. 2, a view in like section with the valve operated to its initial open position, and before release of the handle;

Fig. 3, a transverse section on the line 3—3 in Fig. 1;

Fig. 4, a vertical diametrical section through the valve structure after the release of the operating handle following an initial period of flow through the valve;

Fig. 5, a view in end elevation of the structure; and

Fig. 6, a view in opposite side elevation of the handle supporting mechanism.

Referring to the drawings, in which like characters of reference indicate like parts throughout the several views, there is indicated a supply pipe 10 on which the valve body 11 is mounted, herein shown as by a screw-thread attachment. Leading from the body 11 is a discharge pipe 12 likewise secured in the present showing by screw-threadedly entering the valve body 11. Within the valve, there is the vertically disposed stem 13 on which is secured the valve 14 normally pressed against a seat 15 by means of a compression spring 16 carried in a nut 17, surrounding a lower end of the stem 13 and abutting the underside of the valve 14, all in the usual and well known manner. The valve stem 13 extends from the top side of the valve 14 in sliding relation through an upper portion 18 of the valve body 11.

On this upper portion 18 of the valve body 11, there is mounted a head 19, herein shown as by a screw-threaded attachment as indicated by the threads 20. The upper end of the stem 13 slidingly enters a central vertical bore 21 provided through the head 19. Adjacent the upper end of the stem 13 there is provided an arcuate channel 22 entirely therearound.

To one side of the bore 21 there is provided a bore 23 extending vertically through the head 19 to have its axis parallel to the axis of the bore 21. In this bore 23 there is carried by a sliding fit a post 24, around the lower end of which there is provided an annular channel 25. The lower end of the bore 23 is preferably closed by means of a plug 26.

The bores 21 and 23 are interconnected by a horizontally disposed passageway 27 of sufficient diameter to receive therein in rolling relation a ball 28. The spacing apart of the bores 21 and 23 is made to be such in relation to the diameter of the ball 28, that when the post 24 is in the upper position, Fig. 1, the ball 28 fits by a portion within the annular channel 25 and simultaneously bears by an opposite side against the stem 13 below the channel 22, when the valve 14 is seated all as shown in Fig. 1.

On one side of the body 19, herein shown as on the right hand side, there is provided an extending handle bracket 29, which may be either an integral part or separate part of the body 19, herein shown as a separate and secured to the body 19 by means of a pair of screws 30.

The body 19 above the laterally extending bracket 29 is provided with a transverse passageway 31 to have front and rear upwardly extending portions 32 and 33. Above these body portions 32 and 33, the body merges into a cylindrical collar 35, into which is screw-threadedly engaged a cylinder 36, extending axially in alignment with the bore 21.

The bracket 29 is essentially L-shaped to have an up turned portion 37 transversely across which is carried a pin 38 to carry the spaced apart ends 39 and 40 of the operating lever 41. This lever 41 is formed in L shape to have an up turned portion 42 and the portion 43a, the major portion of which is bifurcated to provide the end portions 39 and 40 which extend substantially horizontally through the passageway 31. In other words the up turned portion 42 is on the opposite side of the cylinder 36 from the pivot pin 32. A torsion spring 43 normally rocks and holds the lever 41 in the upper position as indicated in Fig. 1. This spring 43 has one terminal end 44 entered in the lever end portion 39 and then curved around over the top of the pin 38 to extend downwardly along the side of the bracket up turned end 37 and then enter that bracket by an end portion 45.

Within the cylinder 36 there is provided a piston 46 having a downwardly extending piston rod 47 which slidingly passes out through a lower cylinder head 48 to slidingly enter the upper end of the bore 21 to be in the path of the upper end of the valve stem 13. Normally when the valve 14 is in the closed position, there is a space left between the lower end of the piston rod 47 and the upper end of the stem 13 as indicated in Fig. 1. At a predetermined position spaced downwardly from the top end of the cylinder 36 there is a top head 49 which has a central conical opening 50 therethrough. Then there is a cylinder cap 51 secured to the top end of the cylinder 36 through which there is screw-threadedly carried a needle valve 52 to have its lower end aligned centrally with the conical opening 50 in the head 49. In the form herein shown, the upper cylinder head 49 is screw-threaded internally of the cylinder 36 to the desired location. This head 49 carries a plurality of check valves 53, herein shown as consisting of a ball 54 normally pushed upwardly into a closed position by means of a spring 55 whereby pressure within the cylinder 36 below the head 49 may not be transmitted upwardly into space above the head 49. On the other hand, pressure within the space above the head 49 when it becomes sufficient to overcome the push of the springs 55, may be transmitted past the balls 54 downwardly against the upper side of the piston 46. The piston 46 is shown herein to have the usual cup of a flexible nature such as synthetic rubber 56. There is provided on the top side of the piston 46 an adjustable travel stop 57, herein shown as consisting of a screw entering the piston 46 and extending downwardly somewhat into the piston rod 47. By adjusting the length of this screw 57 above the piston 46, the upper travel of the piston 46 under the urge of the spring 58 which is provided within the cylinder between the underside of the piston 46 and the top side of the lower head 48, is limited by the head of the screw 57 striking against the underside of the top head 49 all as indicated in Fig. 1. The space below the piston 46 within the cylinder 36 is preferably vented to the atmosphere by any suitable means, herein shown as by means of holes 59 through the lower head 48. Likewise the space within the cylinder 36 above the upper head 49 and under the cap 51 may also be vented to the atmosphere by any suitable means, herein shown as through the plug 60.

Adjustably fixed along the piston rod 47 is a collar 61. This collar 61 is adjustably held by any suitable means such as by a set screw 62, Fig. 4, passing through the collar 61 and abutting the piston rod 47. This piston rod 47 extends between the side portions 39 and 40 of the lever 41 in a free manner, and the collar 61 carries a pair of oppositely extending pins 63 and 64. The collar 61 in top plan view is generally rectangular in shape. The pins 63 and 64 are in the paths of lugs 65 and 66 extending inwardly toward the piston rod 47, but with clearance therebetween. The pins 63 and 64 are located to be at all times below these lugs 65 and 66.

The collar 61 carries a third pin 67 which extends at right angles to the axes of the pins 63 and 64. This pin 67 extends through the vertically, elongated eye 68 of a head 69 which is mounted on the top end of the post 24. In other words the pin 67 is free to travel vertically within this eye 68 for a distance. A spring 70 is carried by the post 24 in an upper end portion thereof so as to extend into the eye 68. Across the upper end of this spring 70 there is provided a plate 71 as a bearing against which the pin 67 may yieldingly push downwardly when the handle 41 is lowered sufficiently.

Mounted between the lever portions 39 and 40 is a pawl 72 to rock about a transverse pivot pin 73 in a manner whereby a long arm of this pawl designated by the numeral 74 may extend over into the path of the top side of the collar 61, and further, this pawl 72 is provided with a short downwardly turned leg 75 which comes into contact in certain positions with an upper portion or side of the bracket 29.

A torsion spring 76 surrounds the pivot pin 73 to one side of the pawl 72 and is interconnected between the pawl and the lever portion 39 in such manner that the pawl 72 is normally tended to have its arm 74 rocked downwardly.

Now to describe the operation, reference is first made to Fig. 1, wherein all of the parts are in those positions wherein the valve 14 is closed and there is no flow from the pipe 10 to the pipe 12. Furthermore, in the cylinder 36 in the space between the upper head 49 and the cap 51, there is provided a volume of fluid of any suitable nature. When the flow is to be started, the handle 41 is pulled down by the hand grip 80 and carried on downwardly from the position shown in Fig. 1 to that position shown in Fig. 2. In carrying the lever 41 to that position shown in Fig 2, the piston 46 has been pulled downwardly by reason of the lugs 65 and 66 pushing downwardly on collar pins 63 and 64 to pull the piston downwardly through the connecting rod 47. In causing this travel of the piston 46, fluid which is carried above the upper head 49 is pulled not only through the conical hole 50, but it is also pulled through the check valves 53 which permit a rapid filling of the space between the top side of the cup 56 and the under side of the head 49. This downward pulling of the piston 46 is in opposition to the upward push of the spring 58.

When the lever 41 has been brought down to its lower portion of rocking, the pin 67 will strike the plate 70 and initially push downwardly on the spring 70, by pressure of the pin 67 on the spring covered cap 71. This gives an initially yielding downward push on the post 24, to permit the simultaneous downward push on the stem 13 by means of the connecting rod 47 to open the valve 14 against its closing spring 16, until the ball 28 may enter the channel 22 whereupon the post 24 under the urging of the spring 70 may drop past the ball 28 to assume that position indicated in Fig. 2, whereby the ball 28 then interlocks with the stem 13 to hold that stem in its down position against the upward push of the spring 16. The position of the parts in Fig. 2 are those when the operator has pushed the lever 41 down to its lowermost position, and before the operator has released the handle.

With the valve 14 open as indicated in Fig. 2, flow of fluid from the pipe 10 around and across the valve 14 and into the pipe 12 may then be had. Releasing the valve 41 permits the spring 43 to rock the handle 41 upwardly to its initial position as indicated in Fig. 1 and also as indicated in Fig. 4. The pin 67 travels upwardly within the eye 68 without lifting the head 69, and correspondingly without lifting the post 24 leaving the ball 28 in its stem interlocking position.

As the lever 41 travels upwardly under the urge of the spring 43, the pawl 72 being normally urged downwardly by its arm portion 74 causes the short arm 75 to kick back against the upper portion 37 of the bracket 29. There is provided on this portion of the bracket 29 a notch 81 into which the lower end of the arm 75 may drop under the urge of the spring 76, as indicated in Fig. 4. In so doing, the arm 75 very effectively locks the lever 41 in its upper position so that it may not be pulled downwardly as long as that arm 75 is entered in the notch 81. While this interengagement of the arm 75 with the notch 81 is in effect, the collar 61 being attached to the piston rod 47 is below and out of contact with the free end of the pawl arm 74.

The spring 58 within the cylinder 36 is left free to exert its upward pressure against the piston 46 when the operating lever 41 has returned to its uppermost position as just described. As this spring 58 tends to push the piston 46 upwardly, fluid entrapped between the cup 56 and the head 49 may escape into the chamber of the cylinder 36 above the head 49 only by passing around the end of the needle valve 52. The rate of flow therepassed is of course determined by the depth of the conical end of this valve within the conical seat 50. In other words by turning the valve 52, the rate of flow between the space below and above the head 49 is determined, and consequently that opening past the needle valve determines the rate of speed of return of the piston rod 47 to its uppermost position.

Now as the piston 46 approaches the upper end of its travel, the collar 61 will come into contact with the under side of the free end of the arm 74 of the pawl 72 and will have rocked it out of engagement between its arm 75 and the notch 81 to restore it to that position shown in Fig. 1 whereby a subsequent action may be had. However this release of the pawl 72 is only effected at the extreme upper end portion of travel of the piston rod 47. Likewise as the piston 46 reaches its upper end portion of travel, the pin 67 will have come into contact with the upper end of the eye 68 in the head 69 so that the post 24 will be pulled upwardly to allow the ball 28 to enter into the annular groove 25 therearound, and be particularly urged therein by reason of the upward urge of the spring 16 against the valve 14 tending to lift the stem 13 past the ball 28. In other words the ball 28 will pop into this channel 25 by slight travel upwardly of the post 24 as is determined by the adjustment of the collar 61 along the piston rod 47. Thus the valve 14 may then close, and remain closed until a subsequent operation of the handle or lever 41 all as above described.

Therefore, it is believed to be obvious that, while the invention has been described in minor detail in respect to the one particular form herein shown, mechanical changes and constructions may be employed all without departing from the spirit of the invention, and is therefore desired that the invention not be limited to that precise form, beyond the limitations which may be imposed by the following claims.

I claim:

1. A stem shifting device comprising a body; a stem carried by the body shiftable between first and second positions; means normally yieldingly maintaining said stem in said first position; a cylinder; a head in the cylinder; a fluid reservoir above said head; a piston in the cylinder; a piston rod between said piston and said stem; spring means normally urging said piston toward said head; a lever; a rod carried projecting member in the path of said lever to be contacted by rocking the lever to pull said piston away from said head and shift said stem to a second predetermined position; means actuated by pressure differential between opposite sides of said head induced by travel of said piston away from said head permitting one way flow of fluid from said reservoir to the space between said piston and said head; a return fluid control passageway of predetermined size to said reservoir from said space; interlocking means retaining said stem in said second position; and means actuated by said spring means following in part at least evacuation of said fluid from said space releasing said interlocking means to permit said stem maintaining means to return the stem to its first position.

2. A stem shifting device comprising a body; a stem carried by the body shiftable between first and second positions; means normally yieldingly maintaining said stem in said first position; a cylinder; a head in the cylinder; a fluid reservoir above said head; a piston in the cylinder; a piston rod between said piston and said stem; spring means normally urging said piston toward said head; a lever; a rod carried projecting member in the path of said lever to be contacted by rocking the lever to pull said piston away from said head and shift said stem to a second predetermined position; means actuated by pressure differential between opposite sides of said head induced by travel of said piston away from said head permitting one way flow of fluid from said reservoir to the space between said piston and said head; a return fluid control passageway of predetermined size to said reservoir from said space; interlocking means retaining said stem in said second position; and means actuated by said spring means following in part at least evacuation of said fluid from said space releasing said interlocking means to permit said stem maintaining means to return the stem to its first position; said stem having a recess therein at a predetermined location therealong; said interlocking means comprising a post reciprocatable by said lever and having a recess therein; a ball shiftably interposed between said stem and said post to enter the recess of one when the other is carried therepast, said stem and post being slidable in parallel relation in adjacent bores spaced apart less than the diameter of said ball; a pin on said rod, and a head on said post having an elongated eye into which said pin extends.

3. A stem shifting device comprising a body; a stem carried by the body shiftable between first and second positions; means normally yieldingly maintaining said stem in said first position; a cylinder; a head in the cylinder; a fluid reservoir above said head; a piston in the cylinder; a piston rod between said piston and said stem; spring means normally urging said piston toward said head; a lever; a rod carried projecting member in the path of said lever to be contacted by rocking the lever to pull said piston away from said head and shift said stem to a second predetermined position; means actuated by pressure differential between opposite sides of said head induced by travel of said piston away from said head permitting one way flow of fluid from said reservoir to the space between said piston and said head; a return fluid control passageway of predetermined size to said reservoir from said space; interlocking means retaining said stem in said second position; and means actuated by said spring means following in part at least evacuation of said fluid from said space releasing said interlocking means to permit said stem maintaining means to return the stem to its first position; means yieldingly retaining said lever in a non-operating position; and a pawl holding said lever against travel to the stem shifting position until said piston has effected said evacuation.

4. A stem shifting device comprising a stem; a fluid cylinder; a piston in the cylinder; a rod extending from said piston into the path of said stem; an operating lever pivoted by one portion to a member fixed in relation to said stem and said cylinder; means interengaging said lever and said rod only in a direction of rocking toward said stem as a means of shifting said stem to a predetermined position; means elastically opposing said stem shifting latch means retaining the stem in said position by said rocking of said lever; spring means returning said lever to an inoperative position for subsequent stem travel independently of the lever; an abutment on said rod; a stop on said fixed member; a pawl rockably mounted on said lever between said abutment and said stop and pawl being biased to rock into the path of said abutment and toward said stop to rest against said stop upon return travel of said lever to said inoperative position; spring means returning said rod and piston from shifting of said stem and operation of said latch means; hydraulic means limiting the return speed of said piston and rod; means releasing said latch means toward the end of said return rod travel; and said abutment being located to rock said pawl away from said stop upon said end of rod return travel.

5. A stem shifting device comprising a stem; a fluid cylinder; a piston in the cylinder; a rod extending from said piston into the path of said stem; an operating lever pivoted by one portion to a member fixed in relation to said stem and said cylinder; means interengaging said lever and said rod only in a direction of rocking toward said stem as a means of shifting said stem to a predetermined position; means elastically opposing said stem shifting latch means retaining the stem in said position by said rocking of said lever; spring means returning said lever to an inoperative position for subsequent stem travel independently of the lever; an abutment on said rod; a stop on said fixed member; a pawl rockably mounted on said lever between said abutment and said stop and pawl being biased to rock into the path of said abutment and toward said stop to rest against said stop upon return travel of said lever to said inoperative position; spring means returning said rod and piston from shifting of said stem and operation of said latch means; hydraulic means limiting the return speed of said piston and rod; means releasing said latch means toward the end of said return rod travel; and said abutment being located to rock said pawl away from said stop upon said end of rod return travel; said latch means comprising a lock rod reciprocatable adjacent said stem, both said stem and said lock rod having notches therein at different relative elevations, a ball shiftable between the lock rod and the stem to fit into one of said notches while the member carrying the other notch is in sliding contact with the ball; said lock rod having a head with an elongated eye therein, a spring at one end of said eye, and a member extending from said piston rod into said eye to push said lock rod to carry the lock rod notch past said ball under yielding pressure of the pin against said eye spring, and to pull the lock rod back to its notch registry with the ball upon said pin pushing against the other end of said eye.

6. A stem shifting device comprising a stem; a cylinder; a piston in the cylinder; a piston rod carried by the piston and extending from the cylinder in substantially axial alignment with said stem; a spring normally urging said stem toward said rod to maintain the stem in a predetermined position; a second spring normally urging said piston to a position to hold said rod in a normally inoperative position spaced from said stem; a lever rockably mounted to extend transversely across said rod; abutments provided between said rod and said lever to afford interengagement in travel of said lever from said initial inoperative position to shift said rod to in turn shift said stem to a second predetermined position and permit said lever to return to its said inoperative position in the absence of following travel of said rod; spring means returning said lever to said inoperative position; releasable latch means for retaining said stem in its said second position; a member fixed in position in respect to said lever and having an abutment thereon; a pawl having one end directed toward said rod and another end toward said fixed member, said pawl being pivoted intermediate said ends on said lever, said pawl other end engaging said member to prevent reverse travel of said lever in a period of moving toward and prior to reaching said inoperative position; means actuated by said rod as it approaches its return end of travel as produced by said second spring to release said stem latch means; and hydraulic means yieldingly resisting the action of said second spring.

ROBERT M. BALDWIN.

REFERENCES CITED

The following references are of record in the file of this patent:

UNITED STATES PATENTS

| Number | Name | Date |
|---|---|---|
| 1,108,276 | Tetlow | Aug. 25, 1914 |
| 1,520,691 | Boyuls | Dec. 30, 1924 |
| 2,225,082 | Orshansky | Dec. 17, 1940 |
| 2,363,123 | Franck | Nov. 21, 1944 |

FOREIGN PATENTS

| Number | Country | Date |
|---|---|---|
| 439,602 | Great Britain | of 1935 |